W. A. COOK.
SPLIT RING CLUTCH.
APPLICATION FILED AUG. 4, 1911.
1,014,865.
Patented Jan. 16, 1912.
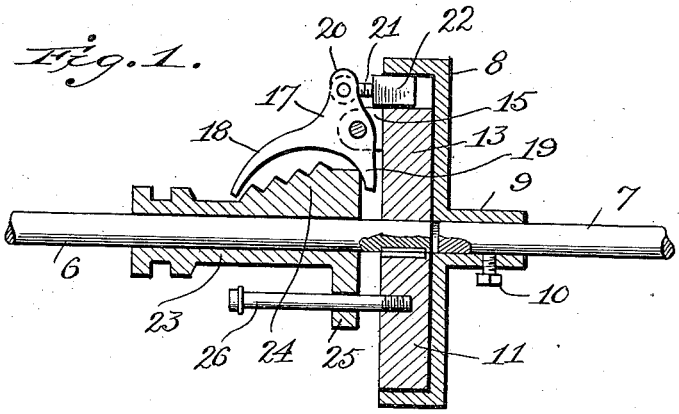
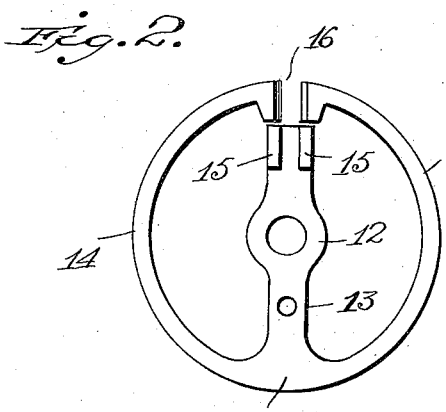
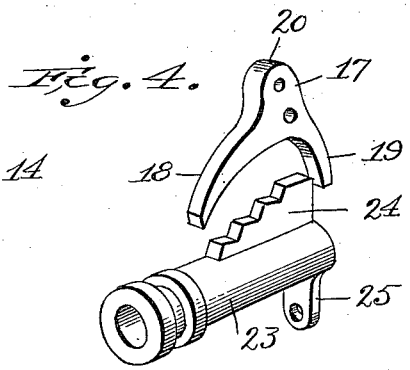
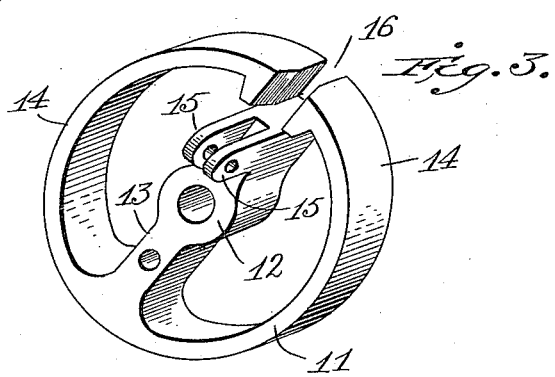
Witnesses
Edwin L. Yewell
Inventor
William A. Cook,
By J. Dushane
his Attorney

UNITED STATES PATENT OFFICE.

WILLIAM A. COOK, OF SOUTH BEND, INDIANA.

SPLIT-RING CLUTCH.

1,014,865. Specification of Letters Patent. Patented Jan. 16, 1912.

Application filed August 4, 1911. Serial No. 642,376.

*To all whom it may concern:*

Be it known that I, WILLIAM A. COOK, a citizen of the United States, residing at South Bend, in the county of St. Joseph and State of Indiana, have invented certain new and useful Improvements in Split-Ring Clutches, of which the following is a specification.

This invention relates to improvements in friction clutches, and has for its primary object to provide means, whereby a simple, inexpensive and easily operated device of this character is obtained, will apply the friction drive gradually, and lock it in intermediate position.

With the above and other objects in view, the present invention consists in the combination and arrangement of the parts as will be hereinafter more fully described, shown in the accompanying drawings, and particularly pointed out in the appended claims, it being understood that changes in the form, proportion, size and minor details may be made within the scope of the claims, without departing from the spirit or sacrificing any of the advantages of the invention.

In the accompanying drawing: Figure 1 is a vertical sectional view of my improved device. Fig. 2 is a front view of the clutch ring. Fig. 3 is a perspective view of the same. Fig. 4 is a detail perspective view of the operating sleeve and pawl, and Fig. 5 is a view of the wedge member.

Like reference numerals designate corresponding parts in all of the figures of the drawing.

In the drawing the reference numeral 6 designates the driving shaft and 7 the driven shaft. The driven shaft has secured upon it a recessed drum 8, provided with a projecting sleeve 9, through which it is secured to said shaft by means of the screw 10. Upon the driving shaft 6 is keyed the split ring 11, the same adapted to be operated within the recess of the drum 8, and comprises a central hub 12, formed in a standard 13, from one end of which is extended the expansion arms 14, and from its other end the lugs 15. The ends of said expansion arms are left separated as at 16 and their adjacent faces are beveled for a portion of their length for a purpose hereinafter set forth. Pivotally mounted between the lugs 15, is a pawl 17, the same having a locking arm 18, a downwardly extending tripping projection 19, and an upwardly projecting lug 20. To the lug 20 is pivotally connected a threaded stem 21, which has mounted thereon the wedge block 22, said block being adapted to engage the adjacent faces of the expansion arms.

To operate the locking pawl and lock it in several positions, a sliding sleeve 23 is mounted upon the driving shaft, and is provided with a grooved collar at one end to receive an operating lever to force said sleeve back and forth upon the shaft in the usual manner. Said sleeve 23 is provided with a toothed lug 24, the teeth of which are in different planes relative to each other and their horizontal faces are slightly inclined relative to the axis of the shaft upon which the sleeve is mounted. The sleeve is also provided with a depending lug 25, apertured to receive a guide pin 26 which passes therethrough, and is secured in the standard 13 of the split ring.

In operation, assuming the parts to be in the position shown in Fig. 1, with the expansion arms out of engagement with the inner faces of the friction-drum 8, the driving shaft is free to rotate independently of the driven shaft carrying the split ring and the sliding sleeve therewith. Upon a movement of the sliding sleeve to the left, the teeth of said sleeve successively engage the arm 18 of the locking pawl, which forces said arm outwardly and causes the wedge 22 to engage the ends of the split ring and expand the same against the friction drum, thereby locking the drum and consequently the driven shaft to the driving member causing them to operate as a unit. To release the parts the sleeve is moved in the opposite direction, when its inner end will engage the projection 19 causing the pawl to rock upon its pivot and withdraw the wedge 22.

It is evident, by regulating the number of the teeth upon the sliding sleeve, the adjustment of the frictional engagement of the two members may be made as gradual or forcible as desired.

The inclined faces of the teeth which engage the end of the locking arm form shallow notches into which the end of said arm rests, thus, if the sleeve is stopped at any point, the clutch is held in a locked position.

By beveling the ends of the expansion arms, it insures the force of the wedge being exerted centrally, and also prevents it sticking.

It will be observed from the foregoing that the clutch engages and disengages by a positive action of the mechanism.

Having thus described the invention what is claimed is:

1. A clutch, comprising a friction drum, a split ring, means for expanding said ring, and a member provided with a toothed lug for operating said expanding means, said teeth gradually increasing in distance from the axis of said member.

2. A clutch, comprising a friction drum, a split ring, means for expanding said ring, and a member provided with a toothed lug for operating said expanding means, said teeth gradually increasing in distance from and inclined relative to the axis of said member.

3. A clutch, comprising a friction drum, a split ring, means for expanding said ring embodying a wedge and a pawl provided with a locking arm and a tripping projection, and a member for operating said expanding means adapted to engage the tripping projection and having a toothed lug for operating said expanding means, said teeth gradually increasing in distance from the axis of said member.

4. A clutch, comprising a friction-drum, a split ring, means for expanding said ring embodying a wedge and a pawl pivoted on the hub of said split ring and provided with a locking arm and a tripping projection, and a slidable sleeve for operating said expanding means having a toothed lug and an apertured lug, the said teeth adapted to engage the end of the said locking arm, and the inner end of said sleeve adapted to engage the tripping projection, and a guide pin secured in the hub of said split ring and adapted to engage said apertured lug.

In testimony whereof I affix my signature in presence of two witnesses.

WILLIAM A. COOK.

Witnesses:
MABEL EMERY,
ANDREW N. HILDEBRAND.

Copies of this patent may be obtained for five cents each, by addressing the "Commissioner of Patents, Washington, D. C."